United States Patent [19]
Kuwayama et al.

[11] Patent Number: 4,626,679
[45] Date of Patent: Dec. 2, 1986

[54] OPTICAL HEAD AND METHOD OF DETECTING THE FOCUS THEREOF

[75] Inventors: Tetsuro Kuwayama; Kazuya Matsumoto, both of Yokohama, Japan

[73] Assignee: Canon Kabushiki Kaisha, Tokyo, Japan

[21] Appl. No.: 533,440

[22] Filed: Sep. 19, 1983

[30] Foreign Application Priority Data

Sep. 22, 1982 [JP] Japan ................................ 57-165258
Sep. 22, 1982 [JP] Japan ................................ 57-165259
Sep. 22, 1982 [JP] Japan ................................ 57-165260

[51] Int. Cl.⁴ ............................................. G11B 7/135
[52] U.S. Cl. .................................... 250/227; 250/201; 369/44; 369/45
[58] Field of Search ............... 250/201 DF, 201 AF, 250/227; 369/44–46; 358/342, 347, 348

[56] References Cited

U.S. PATENT DOCUMENTS

| | | | |
|---|---|---|---|
| 4,135,083 | 1/1979 | Van Alem et al. | 369/45 |
| 4,455,085 | 6/1984 | Kato et al. | 250/201 DF |
| 4,525,625 | 6/1985 | Abe | 250/201 DF |
| 4,530,080 | 7/1985 | Aoi et al. | 250/201 DF |

*Primary Examiner*—Edward P. Westin
*Attorney, Agent, or Firm*—Fitzpatrick, Cella, Harper & Scinto

[57] ABSTRACT

An optical head comprises a light source unit for supplying a light beam, a condensing unit for condensing the light beam from the light source unit on an object surface and directing the light beam from the object surface to a detecting unit, the condensing unit being movable relative to the light source unit and the detecting unit, a detecting unit for detecting the light beam from the condensing unit, and a flexible optical transmitter forming an optical path leading from the light source unit to the condensing unit and an optical path leading from the condensing unit to the detecting unit.

32 Claims, 24 Drawing Figures

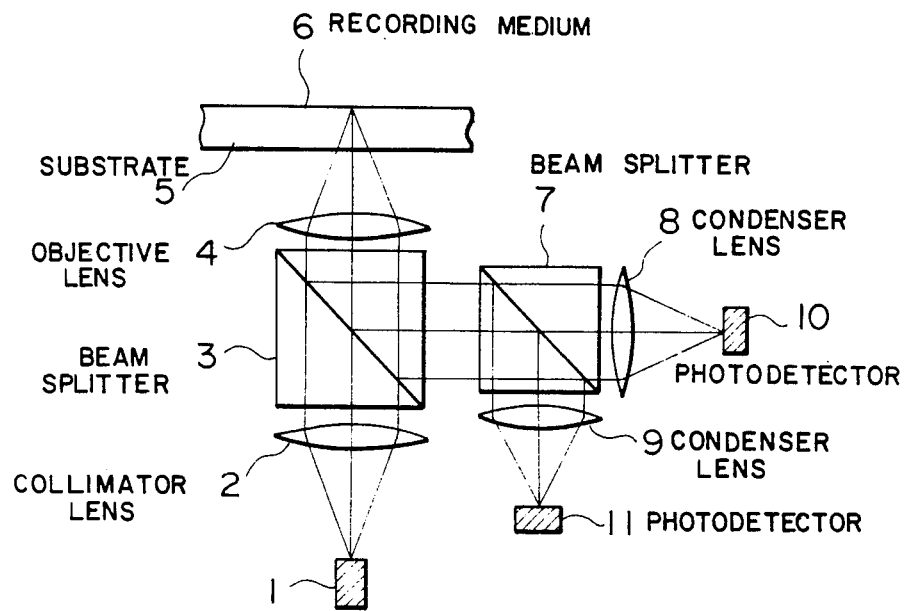
FIG. 1
PRIOR ART
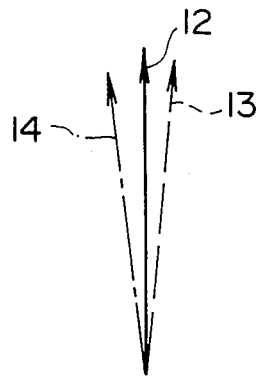
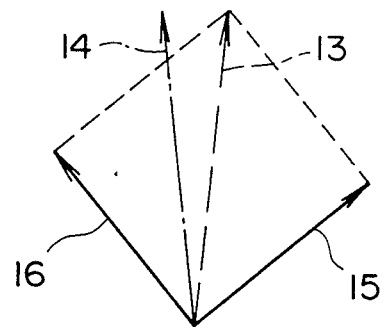
FIG. 2A
PRIOR ART
FIG. 2B
PRIOR ART

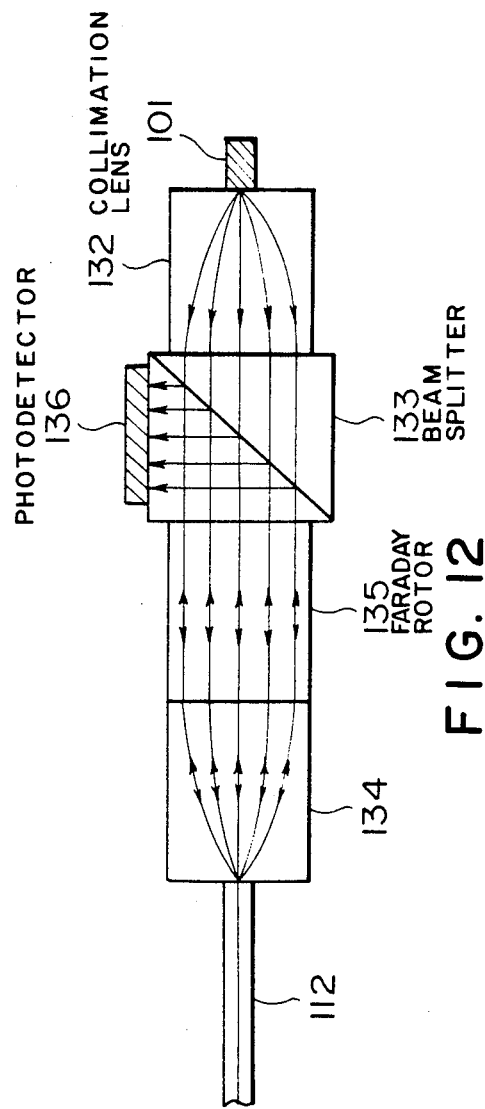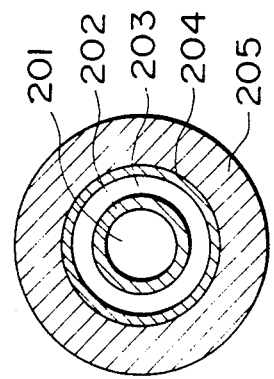

OPTICAL HEAD AND METHOD OF DETECTING THE FOCUS THEREOF

BACKGROUND OF THE INVENTION

1. Field of the Invention

This invention relates to an optical head, and more particularly to an optical head suitable for use in an optical information recording or reproducing apparatus such as a video disc, an optical memory or a magneto-optical memory for utilizing light to record information on an information carrier or reproduce the information recorded on the information carrier, and relates to a method of detecting the focus of such head.

2. Description of the Prior Art

Heretofore, optical heads have been often used in optical information recording or reproducing apparatuses and these are usually designed to condense a light beam on a moving recording medium to form a minute spot and effect the information recording or reproduction utilizing optical modulation. The optical modulation used therein depends on the presence or absence of minute concavities and convexities or apertures, the variation in reflection factor, the direction of magnetization, etc. and, in any recording method, it is necessary to follow the vertical movement of the disc and the horizontal movement of the information recording track at a high speed and at high accuracy and thereby control the position of the light spot. Also, it is desirable that the information recorded at an arbitrary position on the recording medium can be random-accessed within the shortest possible time.

FIG. 1 of the accompanying drawings shows an example in which such a conventional optical head is used in a magneto-optical memory. In FIG. 1, the light beam emitted from a laser light source 1 is made into a parallel light beam by a collimation lens 2, passes through a beam splitter 3, is condensed by an objective lens 4, passes through a substrate 5 and forms a minute spot on a magneto-optical recording medium 6. The light beam which has been reflected by the magneto-optical recording medium 6 and whose plane of vibration has been rotated by a minute angle passes through the objective lens 4 and becomes a parallel light beam and is reflected by the beam splitter 3, whereafter it is divided into two light beams by a polarizing beam splitter 7 used for differential amplification and set to a suitable angle. One of the divided light beams is condensed on a photodetector 10 by a condenser lens 8 and the other light beam is condensed on a photodetector 11 by a condenser lens 9. The light outputs detected by the respective photodetectors have the difference therebetween taken by a differential amplifier (not shown) and signal reading of a high SN ratio is effected.

The principle on which signal detection is accomplished by the polarizing beam splitter is illustrated in FIGS. 2A and 2B of the accompanying drawings. FIG. 2A shows the relation between the plane of vibration of an incident linearly-polarized light and the plane of vibration of the reflected light beam. In FIG. 2A, reference numeral 12 designates the direction of vibration of the incident light beam, reference numeral 13 denotes the direction of vibration of the light beam reflected from a portion on which information is not recorded, and reference numeral 14 designates the direction of vibration of the reflected light from a portion on which information is recorded. The information is recorded by the variation in direction of magnetization of the recording medium, and the light beam corresponds to the direction of magnetization as shown in FIG. 2A and is reflected with the plane of vibration hereof being subjected to the rotations in opposite directions by the magneto-optic Kerr effect. Usually, this angle of rotation (the angle of Kerr rotation) is a minute angle of 1° or less. FIG. 2B shows the manner in which the reflected light 12 from the portion on which information is not recorded is divided into two light beams of equal intensities by the polarizing beam splitter. By the transmitting plane of vibration of the polarizing beam splitter 7 of FIG. 1 being set to the direction of 45° with respect to the direction 12, the quantity of light detected by the photodetector 10 of FIG. 1 becomes a quantity of light corresponding to arrow 15 and the quantity of light detected by the photodetector 11 becomes a quantity of light corresponding to arrow 16. As a result, the difference between the two quantities of light becomes zero while, on the other hand, the two quantities of light are not equal to each other in the light beam 14 from the portion on which information is recorded and therefore, a signal output is produced to render the information-reading possible. The advantage of such differential detection lies not only in that the apparent degree of signal modulation is increased, but also in that the influences of the fluctuation of the reflection factor of the recording surface, dust, the variation in intensity of the light source, etc. are negated to a considerable degree, and the effect thereof is very great.

In the magneto-optical memory, in order that the light beam may be converged on the magneto-optical recording medium, it is necessary to detect the distance between the objective lens and the recording medium and control the optical head in accordance with that distance to ensure the light beam to be of a minimum diameter on the recording medium. For the detection of such distance between the objective lens and the recording medium, i.e., the so-called focus detection, there has heretofore been adopted a method using a cylindrical lens to detect the in-focus position by the shape of a point image or a method using a knife edge to detect the in-focus position by movement of the position of the point image.

However, the prior art optical heads, including the above-described example, are of a construction including a light source, photodetectors, etc. and therefore, bulkiness and increased weight of the head are unavoidable. Also, where the focus detecting means as described above is provided, the construction of the head becomes complex and assembly and adjustment thereof are cumbersome and further, the optical head becomes bulky and heavy. Such bulkiness and heavy weight have been great obstacles to the aforementioned high-speed and highly accurate access required of the optical head.

SUMMARY OF THE INVENTION

It is an object of the present invention to provide an optical head which has a compact and light-weight movable portion and which permits high-speed random access.

It is another object of the present invention to provide an optical head which enables focus detection to be accomplished by a simple construction and a method of detecting the focus of such optical head.

The present invention achieves the above objects by an optical head comprising a light source unit for supplying a light beam, a condensing unit for condensing the light beam from the light source unit on an object surface and directing the light beam from the object surface to a detecting unit, the condensing unit being movable relative to the light source unit and the detecting unit, a detecting unit for detecting the light beam from the condensing unit, and a flexible optical transmitter forming an optical path leading from the light source unit to the condensing unit and an optical path leading from the condensing unit to the detecting unit, and a method of detecting the focus of such optical head.

The invention will become more fully apparent from the following detailed description thereof taken in conjunction with the accompanying drawings.

BRIEF DESCRIPTION OF THE DRAWINGS

FIG. 1 schematically shows an example of the prior art optical head used in a magneto-optical memory.

FIGS. 2A and 2B illustrate the reading of information by the magneto-optic effect.

FIG. 12 shows a modified form of the light source unit in the fifth embodiment.

FIG. 14 is a cross-sectional view showing the structure of a dual core type optical fiber used in the sixth embodiment.

DETAILED DESCRIPTION OF THE PREFERRED EMBODIMENTS

Figure 3:
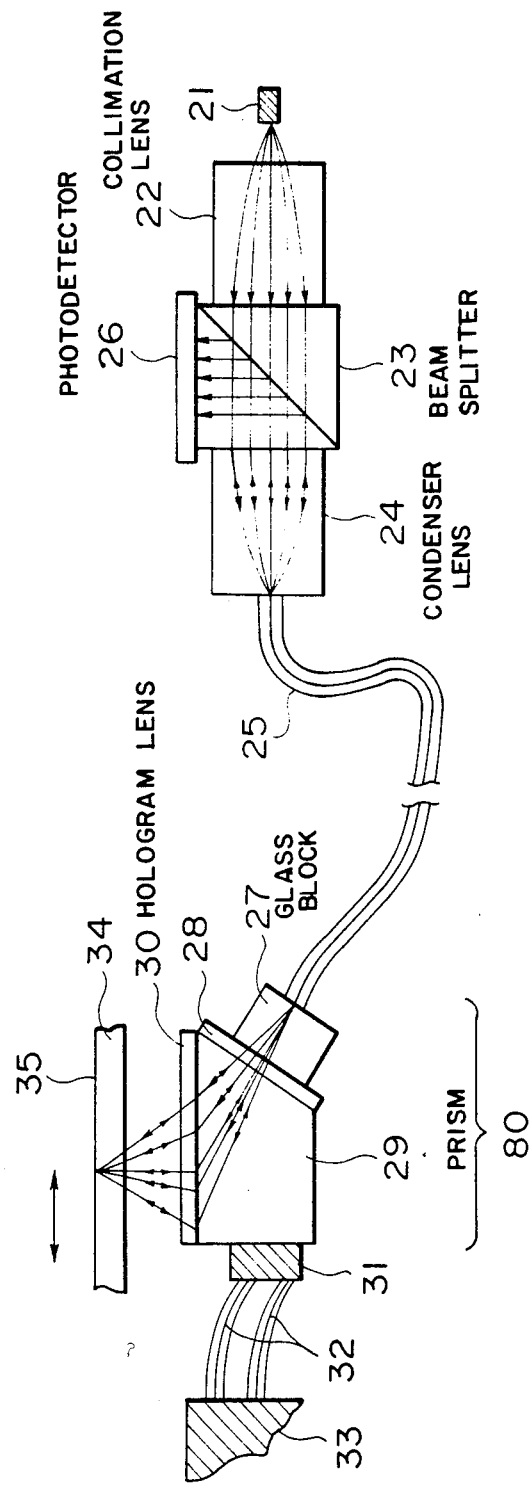
FIG. 3 schematically shows a first embodiment of the optical head of the present invention used in an optical memory.

FIG. 3 is a schematic view showing a first embodiment of the optical head of the present invention used in an optical memory. A light beam emitted from a light source 21 such as a laser passes through a collimation lens 22 and is made into a parallel light beam thereby, whereafter it passes through a polarizing beam splitter 23 and is condensed on the end surface of an optical fiber 25 by a condenser lens 24 and then transmitted to a light condensing portion 80 by the optical fiber 25. The optical fiber 25 used is a so-called single polarization optical fiber which can transmit the polarized light incident on one end thereof to the other end while keeping its polarized state, and may be of one of various types such as elliptic clad type, elliptic jacket type, side-pit type and square-core type. Such an optical fiber, including the clad thereof, has a diameter as small as the order of 100 μm and is very light in weight and has a characteristic that it does not lose the property of transmitting linearly polarized light even if it is bent to a radius of several millimeters or a load is applied to it.

The linearly polarized light emergent from the exit end of the optical fiber passes through a glass block 27, whereafter it passes through a λ/4 plate (quarter wave plate) 28 and becomes a circularly polarized light and is condensed on a recording surface 35 by a hologram lens 30 formed on a prism 29, through a substrate 34. The hologram lens used is made of a volume-type hologram sensitive material such as dichromated gelatin or photopolymer and has the capability of diffracting and condensing the incident light beam at a high diffracting efficiency.

The present embodiment is shown as an example applied to an optical memory using an optical video disc or a digital audio disc as a recording medium, and effects information reading by a variation in quantity of light resulting from the unevenness of the recording surface or the variation in reflection factor.

The light beam reflected by the recording surface 35 passes through the substrate 34, whereafter it is again diffracted by the hologram lens 30 and is condensed on the end surface of the fiber 25. At this time, the light beam again passes through the λ/4 plate 28 and therefore, it becomes a linearly polarized light having a plane of vibration in a direction orthogonal to the direction of incidence. The single polarization optical fiber has the function of independently transmitting linearly polarized lights having planes of vibration in directions orthogonal to each other without mutual interference therebetween and therefore, this reflected light beam travels reversely along the optical path during its incidence and enters the polarizing beam splitter 23. At this time, the plane of vibration of the reflected light beam is in a direction orthogonal to the direction of incidence and therefore, the light beam is reflected by the polarizing beam splitter and enters a photodetector 26, whereby signal detection is effected. In the present embodiment, the light condensing portion includes no beam splitter and the light condensing portion is made very compact and light in weight.

Thus, the present invention transmits the light beam from the light source portion to the condensing portion or from the condensing portion to the detecting portion by an optical fiber, thereby forming a light-weight condensing portion which can be rapidly moved during random access and greatly reducing the access time.

Since the photodetector is not included in the weight of the movable portion, a photodetector of high sensitivity and low noise can be used irrespective of its size and weight and also, the use of a photodetector made integral with a head amplifier portion becomes possible.

In the present embodiment, the λ/4 plate is provided in the condensing portion, but alternatively, it may be disposed between the polarizing beam splitter of the light source portion and the end surface of the optical fiber. In this case, the single polarization optical fiber used must have a characteristic of independently transmitting circularly polarized lights different in the direction of rotation.

Also, in the present embodiment, the condensing portion is compact and light in weight and therefore, by the entire condensing portion being moved as by a bi-morf element (piezo-electric device), whereby focus adjustment and tracking can be realized by a simple driving mechanism. In FIG. 3, the optical head is mounted on a holding arm 33 through a parallel plate spring type piezo-electric device (bimorf element) 32, which is joined to a prism 29 with an elastic material 31 such as rubber interposed therebetween.

A focus error signal is applied as an input to the piezo-electric device 32 by a mechanism, not shown, and the condensing portion is moved up and down toward the recording medium. By adopting the parallel plate spring structure as described above, any harmful inclination is not created even if the condensing portion is driven at a great amplitude.

In the above-described example, focus adjustment has been described, but a similar mechanism may be provided in a plane parallel to the recording medium in a direction substantially orthogonal to the direction of movement of the recording medium and the condensing portion may be moved in response to a tracking signal, whereby auto tracking can be accomplished.

Further, by fixing the position of the hologram lens 30 relative to the end of the optical fiber 25 as in the present embodiment, it becomes possible to completely obviate the disadvantage that the imaging performance of a point image is reduced by the variation in the relative position of the incident light beam and the hologram lens resulting from the focus adjustment drive which has heretofore offered a problem when use is made of a hologram lens (particularly an off-axis hologram lens). Such as off-axis hologram lens enables a light beam to enter from a side surface of the hologram substrate as shown in FIG. 3 and therefore, the thickness of the condensing portion can be made very thin. This is advantageous when a great capacity memory for effecting recording-reproduction with an optical head inserted between the recording discs is to be realized.

In the head of such construction, it is desirable that the direction of the recorded information track be disposed in the same plane as the optical axis of the hologram-reproduced light, that is, the grating direction of the diffraction grating near the center of the hologram lens be disposed in a direction orthogonal to the track direction. More specifically, this is a construction in which, as shown in FIG. 3, the information bearing surface 35 is moved relatively to the left and right in the plane of the drawing sheet, and the adoption of such an arrangement gives rise to the advantages as shown below.

A first advantage is that the parts such as the hologram lens and the optical fiber are disposed symmetrically relative to the information recording track. Control of the tracking direction in an optical disc must be carried out at very high accuracy of ±0.1 μm and it is not preferable that any excessive movement such as fluctuation of the signal reading-out position occurs with the tracking operation. Also, since the direction of tracking drive is a direction orthogonal to the optical fiber 25, immoderate stress is hard to be created in the optical fiber.

A second advantage of such a construction is that the influence imparted to the tracking is minimized even if a minute wavelength change occurs to the laser. In an optical disc, as previously described, the allowable error in the tracking direction is as small as ±0.1 μm. In contrast, wavelength skip of the order of 1 nm may occur in a semiconductor laser due to a temperature change and as a result, the imaged spot is displaced by the order of 0.1 μm to the left and right in the plane of the drawing sheet of FIG. 3. When such wavelength skip occurs during signal reading, it is expected to become a fatal obstacle to the tracking servo function. When the direction of track movement is the left to right direction in the plane of the drawing sheet of FIG. 3, the movement of the point image by a wavelength change occurs in the direction of movement and therefore, it offers little or no problem in the digital recording or the like with an error correction sign.

Figure 4A:
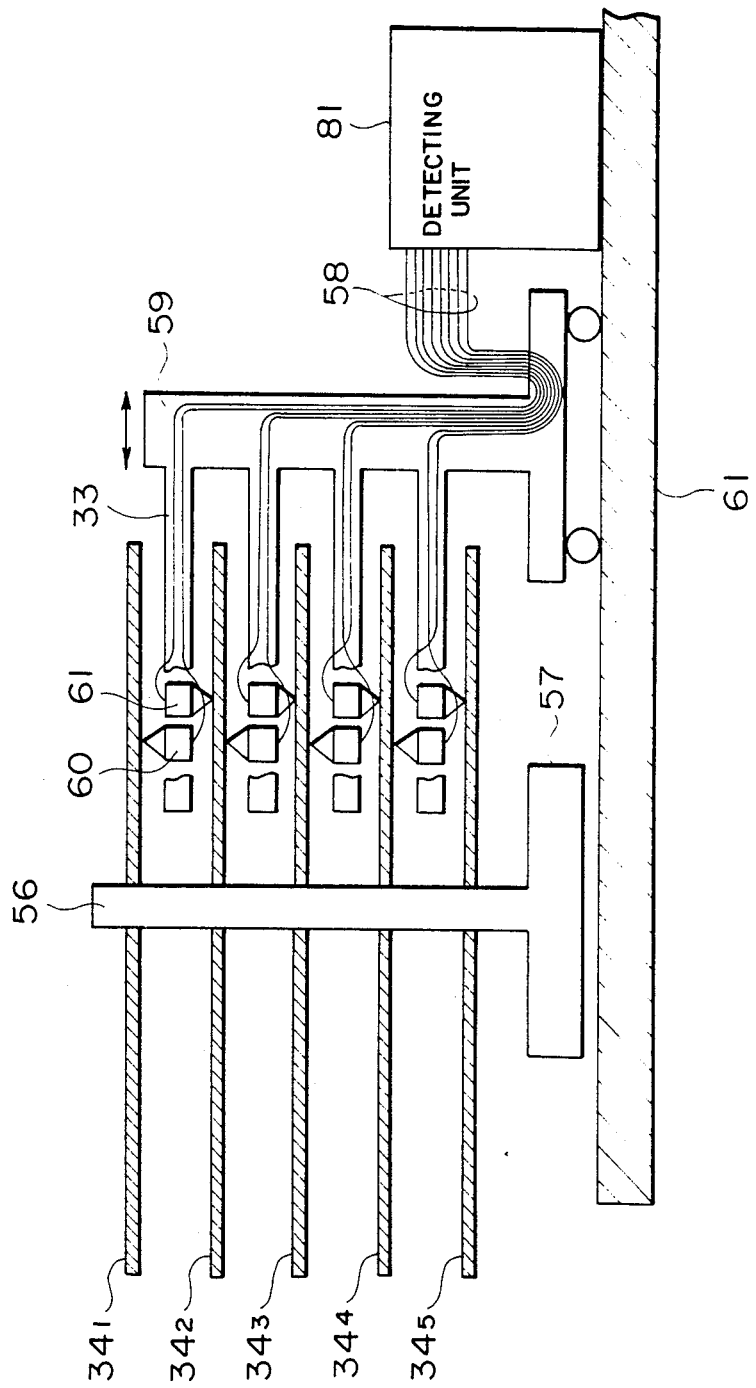
FIGS. 4A and 4B schematically show an example in which the optical head of the present invention is applied to a large capacity file memory.
Figure 4B:
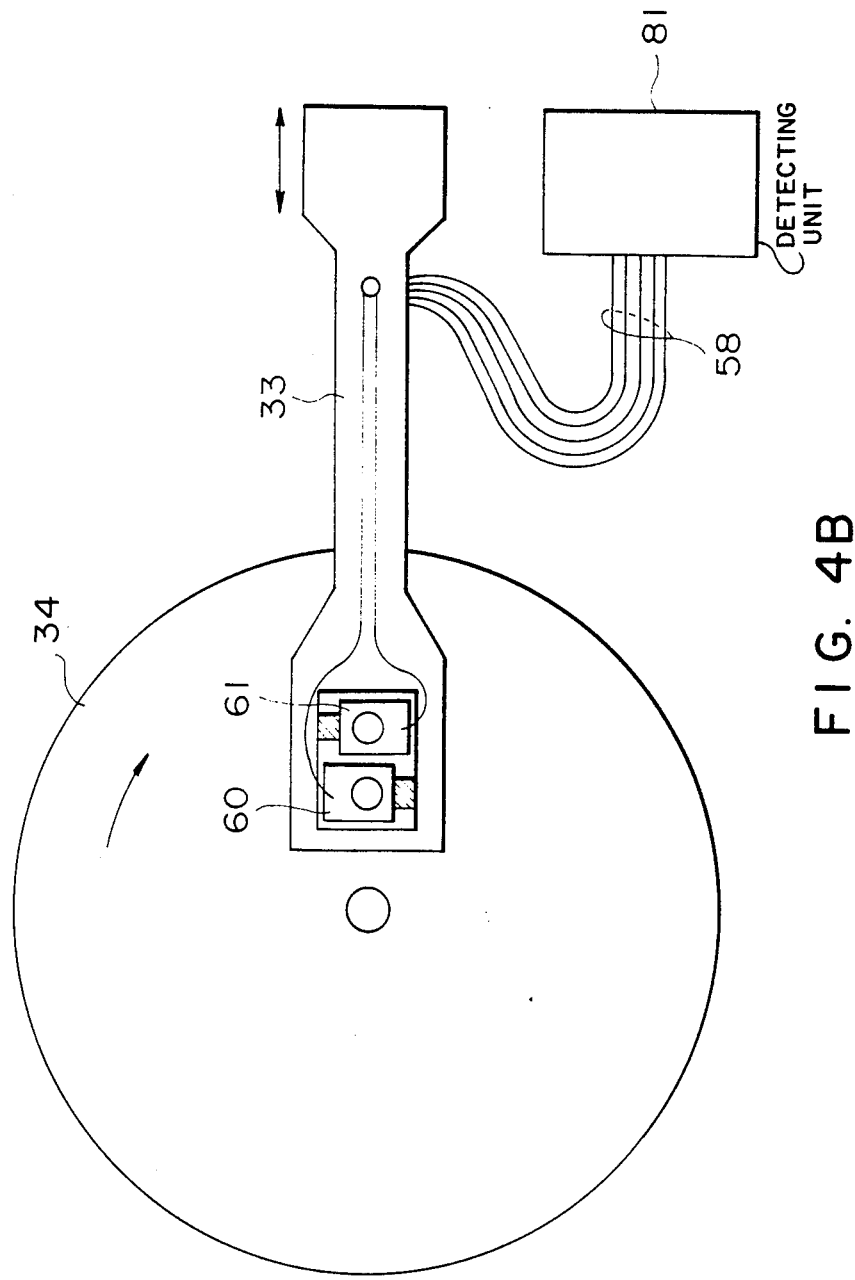

An example of the construction of a large capacity disc file memory suited to use the optical head as previously described is shown in FIGS. 4A and 4B. FIG. 4A is a side view and FIG. 4B is a plan view. The substrates $34_1, 34_2, \ldots, 34_5$ of the information carrier are attached to a rotary, shaft 56 rotated by a motor 57. Condensing portions 60 and 61 are mounted on an arm 33 and are driven at a high speed for focusing and tracking, respectively. A plurality of arms and a plurality of optical heads are provided as required, and a necessary number of optical fibers are led out from the respective heads. These optical fibers are bundled into a fiber bundle 58 along the strut of a carriage unit 59 moved over a long stroke during random access, and the fiber bundle 58 is directed to a light source unit and a detecting unit 81 fixed to the frame 61 of the body of the apparatus. By such a construction being adopted, the weight of the movable portion becomes small and as a result, the carriage unit 59 can be moved at a high speed during random access. Due to the fact that the condensing portions 60 and 61 are made super-thin by the use of the optical fibers, the spacings between the substrates $34_1, 34_2, \ldots, 34_5$ lead to the possibility of constructing a more compact system of larger capacity than any known disc file memory system.

Light sources and photodetectors as shown in FIG. 3 corresponding in number to the condensing portions may be installed in the light source unit and the detecting unit 81, but alternatively, the light source unit and the detecting unit may be constructed by only a set of semiconductor laser and photodetector by using an optical switch known in the field of optical communication. This is shown in FIG. 5.

Figure 5:
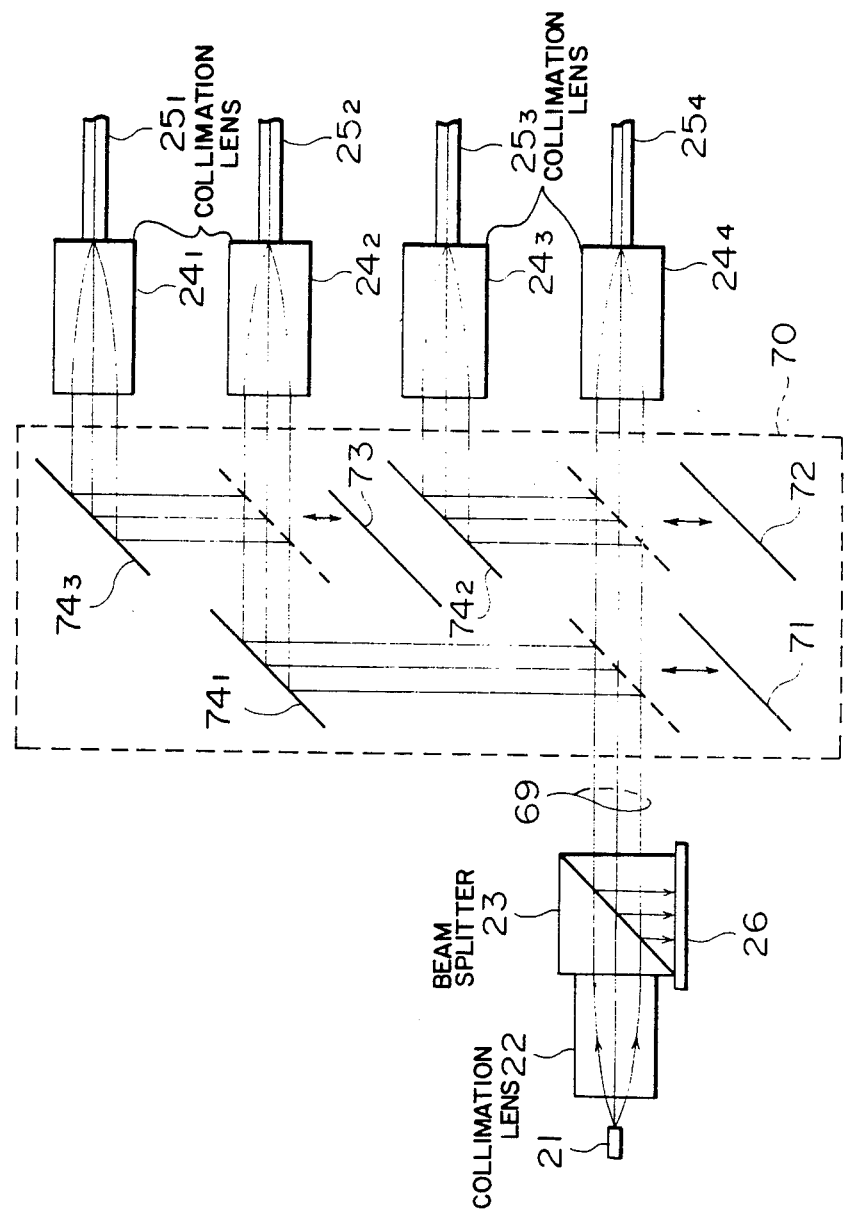
FIG. 5 schematically shows an example of the construction of the light source unit and detecting unit of an optical head used in a large capacity file memory.

FIG. 5 shows an example in which an optical switch is used and the transmission of light to four condensing portions and the detection of the light are realized by a set of light source and photodetector. The parallel light beam 69 enters an optical switch unit 70 comprising fixed mirrors $74_1, 74_2, 74_3$ and movable mirrors 71, 72, 73. At the light beam exit portion of the optical switch, optical fibers $25_1, 25_2, 25_3$ and $25_4$ combined with collimation lenses $24_1, 24_2, 24_3$ and $24_4$ are disposed and the light beam is changed over by movement of the movable mirrors 71, 72 and 73. In FIG. 5, change-over of the light beam is effected by movement of the reflecting mirrors, whereas use may be made of any optical switch which is in accord with the objects of the present invention. Also, in FIG. 5, there is shown an example in which the illuminating light beam and the reflected light beam are changed over on the same optical path, but it is also possible to change over the illuminating light beam and the reflected light beam separately from each other.

Figure 6:
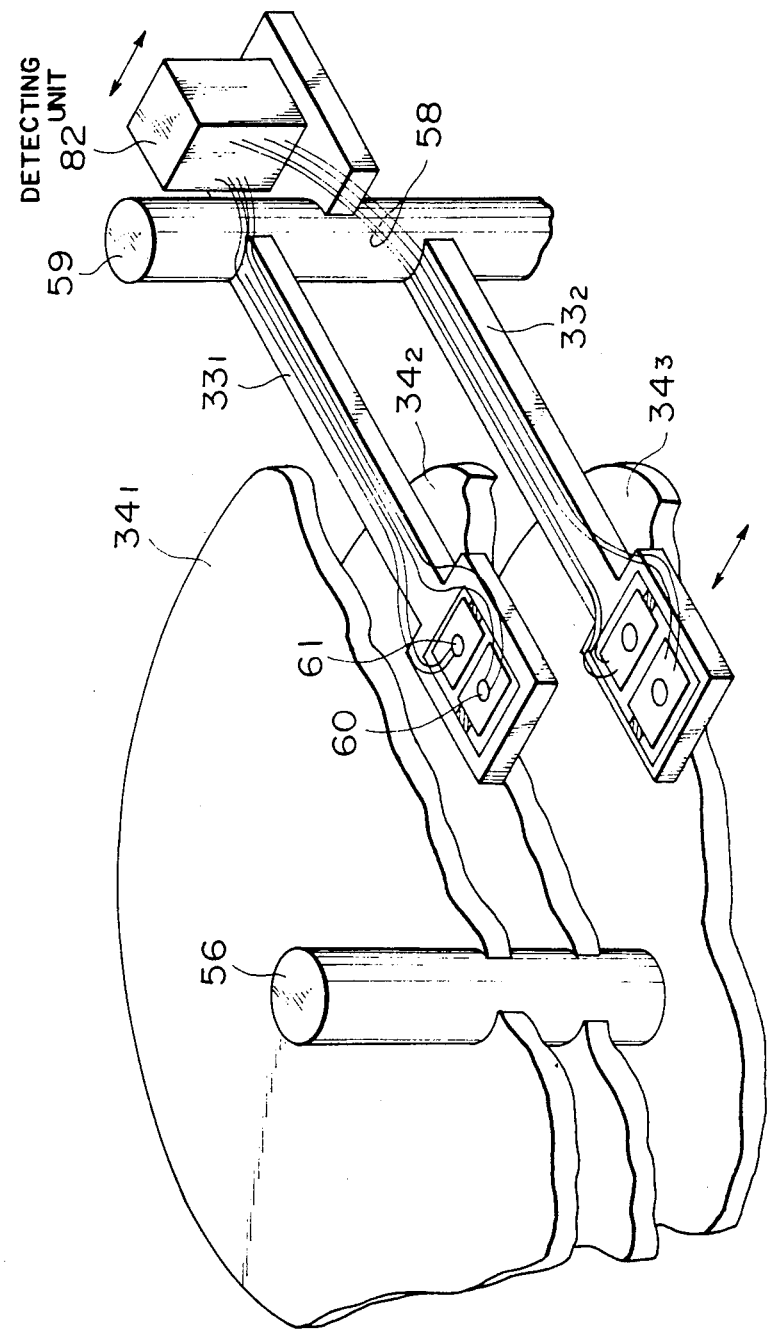
FIG. 6 is a perspective view showing another example of the construction of the large capacity file memory.

FIG. 6 shows an optical disc system using the above-described switching circuit. Arms $33_1$ and $33_2$ holding the head are disposed between disc substrates $34_1$, $34_2$ and $34_3$ mounted on a rotary shaft 56, and condensing portions 60 and 61 are mounted on the respective arms. During random access, the arms $33_1$ and $33_2$ are rotated about a rotary shaft 59 and, during auto focusing and tracking, the condensing portions 60 and 61 are driven at a high speed by a piezo-electric device as shown in FIG. 3. The optical fiber bundle 58 from the condensing portions is directed to a light source unit and detecting unit 82 containing an optical switch therein. The light source unit and detecting unit 82 in the present example can be made compact and light in weight by using an optical switch and therefore, even if they are fixed to the rotary shaft, they do not hamper the movability of the rotary shaft. Also, by adopting such a construction, it is possible to construct a compact, light-weight optical disc system in which high-speed random access is possible. That is, only a set of light source and photodetector is required for a number of condensing portions, and this leads to the possibility of providing an apparatus which is compact and light in weight as a whole. Also, random access is made possible by rotation of the arms $33_1$ and $33_2$ and therefore, high-speed random access becomes possible while, on the other hand, auto focusing and tracking can be accomplished by driving only the light-weight condensing portions 60 and 61, and this leads to simplicity of the construction.

Figure 7:
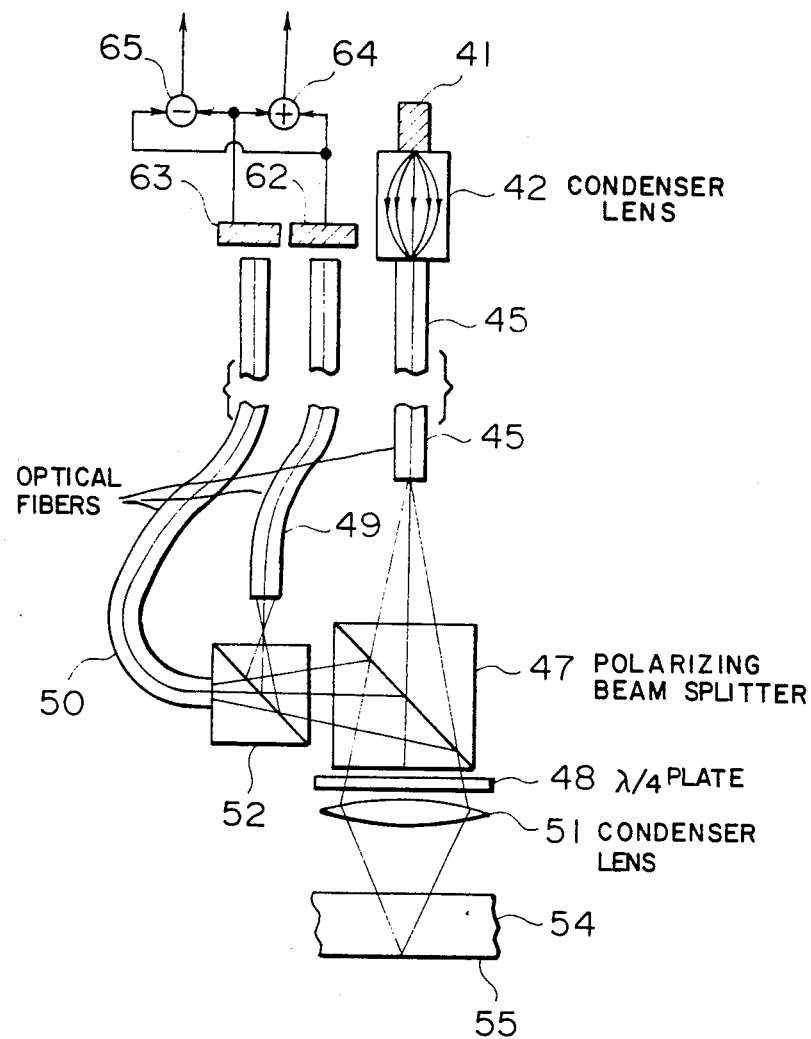
FIG. 7 schematically shows a second embodiment of the optical head of the present invention including a focus detecting system.

A second embodiment of the present invention is shown in FIG. 7. The light beam emitted from a laser light source 41 is condensed on one end of a single polarization optical fiber 45 by a condenser lens 42. The linearly polarized light beam emergent from the other end of the optical fiber 45 passes through a polarizing beam splitter 47, whereafter it passes through a λ/4 plate 48 and becomes a circularly polarized light, which is condensed on an information bearing surface 55 by a condenser lens 51 through a substrate 54. The light beam reflected and modulated by the information bearing surface 55 passes through the lens 51 and then again passes through the λ/4 plate 48 and becomes a linearly polarized light having a plane of vibration in a direction orthogonal to the direction of incidence, and is reflected by the polarizing beam splitter 47. This reflected light beam is divided by a beam splitter 52 and the divided light beams enter single mode optical fibers 49 and 50. The quantity of light effectively entering a single mode optical fiber when light is caused to enter such optical fiber is very sensitive to the degree of sphericity of the light beam and the size of the spot. The highest efficiency occurs when the size of the light spot is the same as the size of the distribution of the light beam transmitted through the single mode optical fiber and the light beam is in the form of beam waist on the end surface of the optical fiber. The light beams transmitted through the optical fibers 49 and 50 are detected by photodetectors 62 and 63, and the output difference between the two photodetectors is calculated by a subtractor 65 and becomes a defocus signal, and reading of the information on the information bearing surface is effected by the output of an adder 64.

Figure 8:
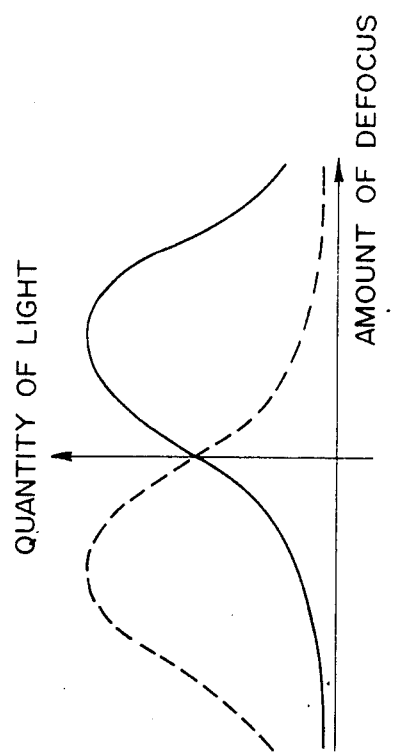
FIG. 8 illustrates the principle of focus detection in the second embodiment.

FIG. 8 shows the manner in which detection of the amount of defocus is effected by single mode optical fibers disposed forwardly and rearwardly of the condensing point shown in FIG. 7. In FIG. 8, the abscissa represents the amount of defocus from a reference position and the ordinate represents the quantity of light. Two curves indicated by a solid line and a broken line, respectively, show the quantities of light taken out from the two optical fibers. The information of near focus and far focus and the amounts thereof are detected by taking the difference between the output values of these quantities of light. As is apparent from the foregoing description, detection of defocus can theoretically be accomplished simply by using a single fiber. Also, the aforementioned single mode optical fibers enable detection of high sensitivity, whereas the present invention is not restricted thereto but may also use an optical fiber or an optical waveguide having a suitable core diameter. By minutely moving the optical head at a sufficiently high frequency in the direction of the optical axis in accordance with the thus obtained defocus signal, automatic focus adjustment becomes possible.

Figure 9A:
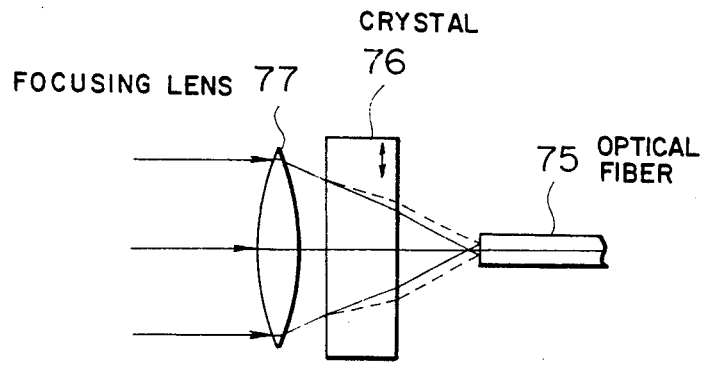
FIGS. 9A, 9B and 9C are fragmentary views illustrating the construction of a third embodiment of the optical head of the present invention including a focus detecting system.
Figure 9B:
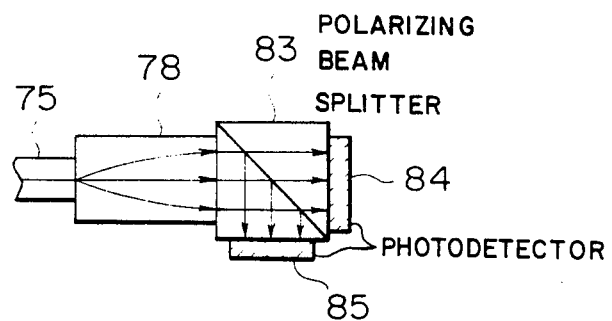
Figure 9C:
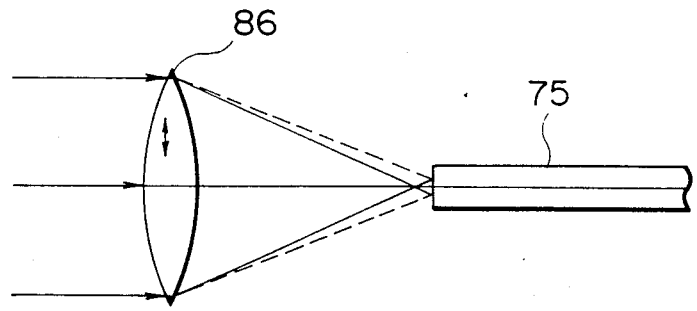

FIGS. 9A, 9B and 9C show a third embodiment of the present invention to which the above-described focus detecting means is applied. These Figures show only the portion which uses an optical fiber to effect photodetection, and the other portion is constructed similarly to the second embodiment.

In FIG. 9A, a parallel flat plate 76 of crystal having an angle of 45° with respect to the plane of vibration of a light beam is disposed in the linearly polarized light beam from the recording medium converged by a focusing lens 77. The light beam having entered the crystal travels while being divided into a normal ray and an abnormal ray, and separation of the condensing point in the direction of the optical axis occurs from the difference in refractive index for the two rays. An optical fiber 75 is a single polarization optical fiber which transmits the normal ray and the abnormal ray independently of each other. FIG. 9B shows a signal detecting portion. The light beam emergent from the optical fiber 75 is made into a parallel light beam by a collimation lens 78, whereafter it is separated into two light beams by a polarizing beam splitter 83 and these two light beams are detected by photodetectors 84 and 85. An in-focus signal is obtained from the difference or ratio between the quantities of light entering the two photodetectors.

FIG. 9C shows a modification of the third embodiment of the present invention shown in FIG. 9A. The light beam reflected by the information bearing surface is condensed by a condenser lens 86 having different refractive indices for the normal ray and the abnormal ray. One end of the single polarization optical fiber 75 is disposed intermediately of the condensing positions for the normal ray and the abnormal ray created during in-focus. As a result, entirely the same effect as that of the FIG. 9A embodiment is obtained and thus, the in-focus position and the amount and direction of defocus are detected.

Figure 10:
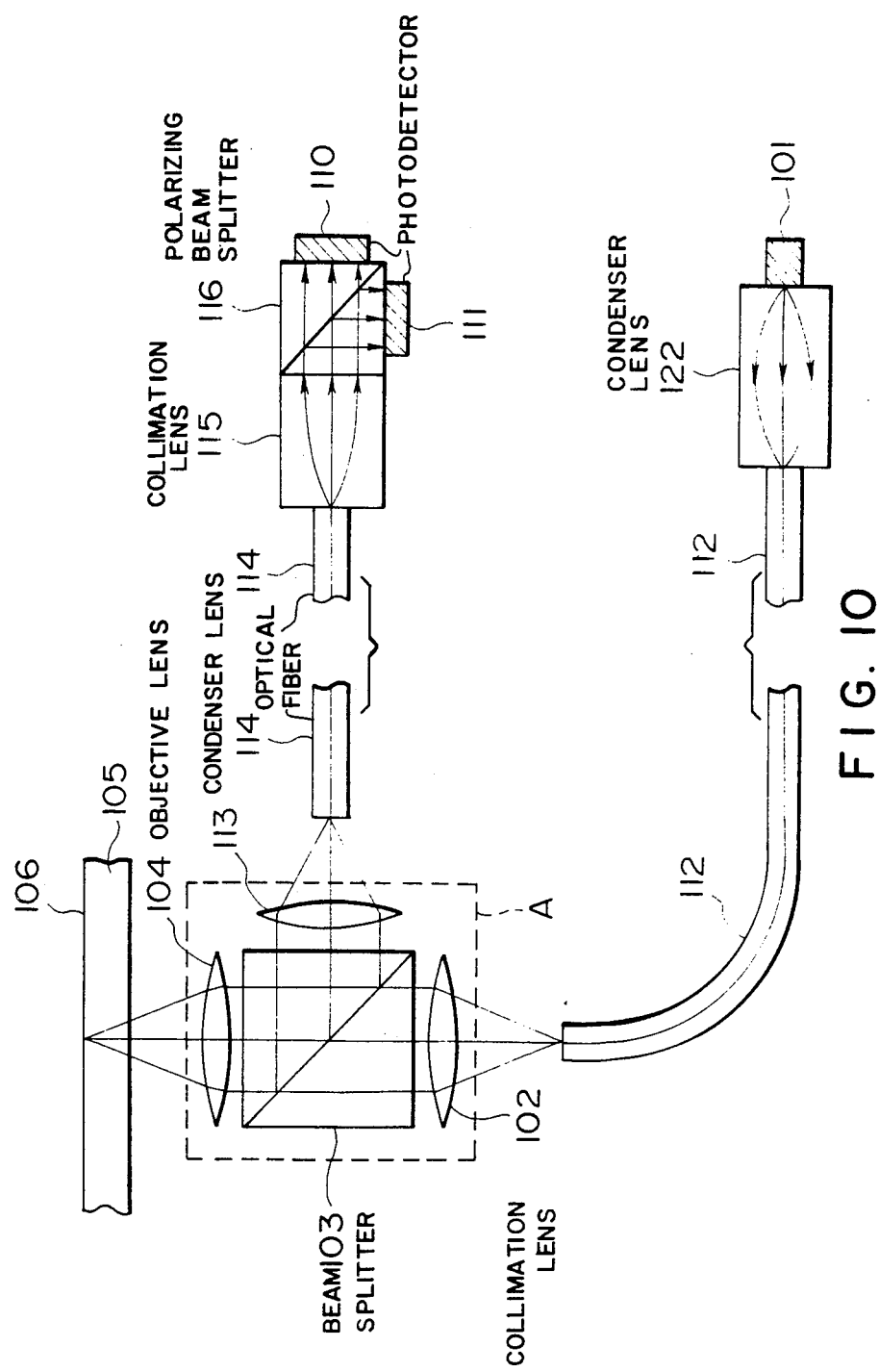
FIG. 10 schematically shows a fourth embodiment of the optical head of the present invention used in a magneto-optical memory.

FIG. 10 is a schematic view showing a fourth embodiment in which the optical head of the present invention is applied to a magneto-optic memory. In FIG. 10, the light beam from a laser light source 101 is directed to one end of a single polarization optical fiber 112 by a condenser lens 122. The light beam emergent from the other end of the optical fiber 112 is made into a parallel light beam by a collimation lens 102 and passes through a polarizing beam splitter 103. This beam splitter 103 should desirably have a polarizing characteristic optimum for the reading-out of magneto-optic recorded signals, and for example, has a transmission factor of 70% and a reflection factor of 30% for the incident light beam and has a reflection factor of 100% for a linearly polarized light orthogonal thereto. An objective lens 104 condenses the light beam on a magneto-optic recording surface 106 through a substrate 105, and the reflected light beam again passes through the objective lens 104 and becomes a parallel light beam. The reflected light beam is reflected by the beam splitter 103 whereafter it is condensed by a condenser lens 113 and directed to an optical fiber 114. This optical fiber 114 is a single polarization optical fiber and independently transmits therethrough a set of linearly polarized lights orthogonal to each other and having planes of vibration in the directions indicated by 15 and 16 in FIG. 2. A collimation lens 115, a polarizing beam splitter 116 and photodetectors 110 and 111 are disposed at the other end of the optical fiber, and the reading-out of magneto-optic record is effected by differentially detecting the signals from the respective photodetectors.

By adopting such a construction, in a case where the present invention is used in a magneto-optic disc device or the like, the necessary minimum optical parts are only disposed in the condensing unit as shown by A in FIG. 10 which must be moved over a long distance during random access of information, and the detecting unit including a weighty photodetector, amplifier (not shown), etc. can be fixed to the apparatus body. The condensing unit and the detecting unit are connected together by a freely bendable optical fiber and therefore, the condensing unit can be freely moved at a high speed. Also, the mutual positional adjustment of the polarizing beam splitter, the condenser lens and the photodetector which have heretofore required delicate adjustment can be accomplished simply by disposing the optical fiber at a proper position and in a proper direction of rotation in the condensing unit, and this leads to a decreased number of parts and simplicity of the construction.

Figure 11A:
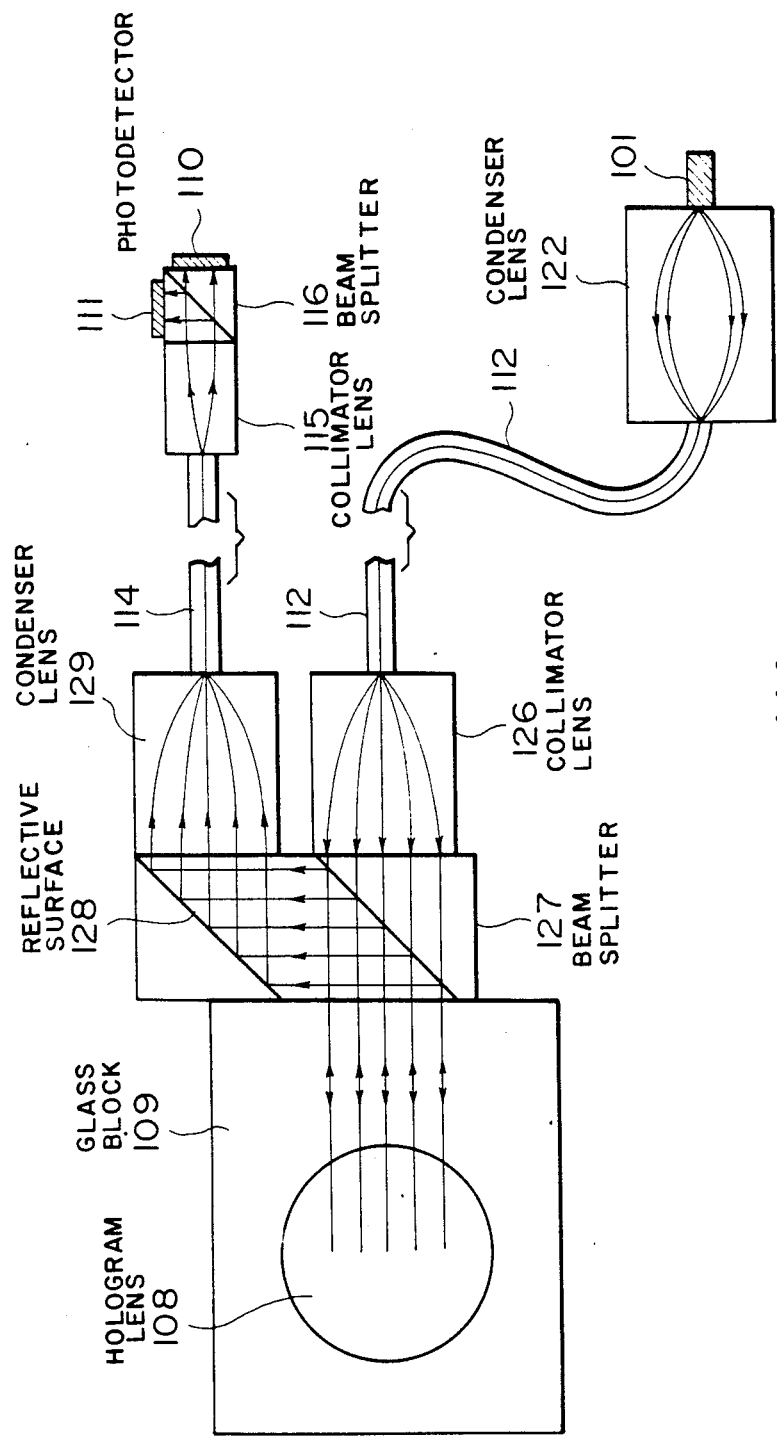
FIGS. 11A and 11B schematically show a fifth embodiment of the optical head of the present invention used in a magneto-optical memory.
Figure 11B:
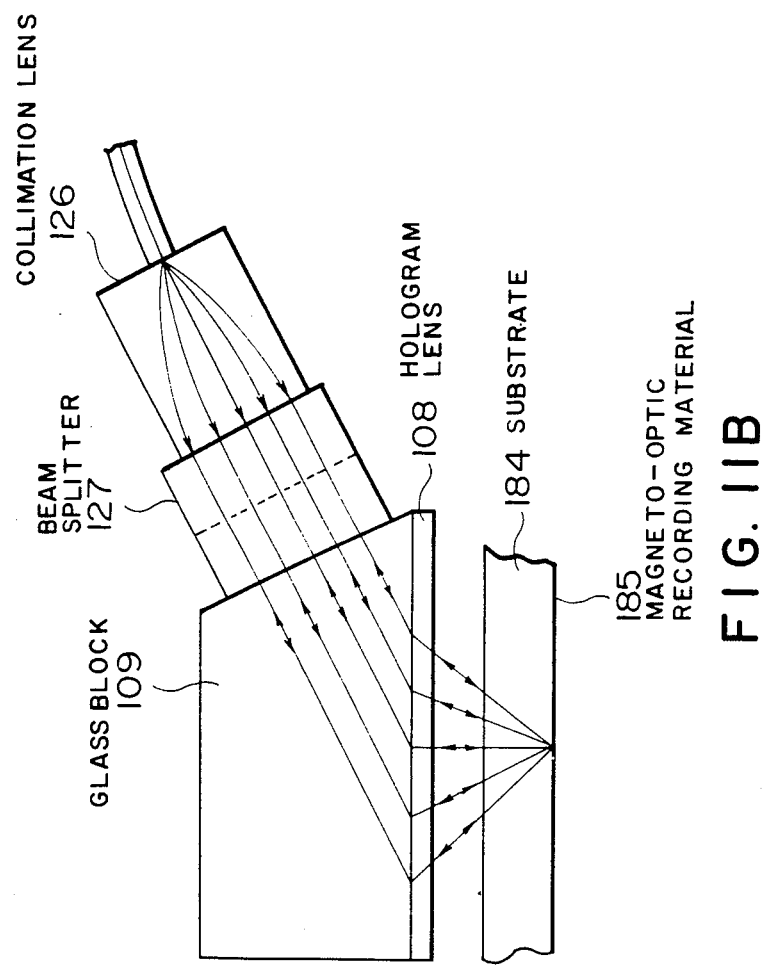

FIGS. 11A and 11B show a fifth embodiment in which the optical head of the present invention is applied to a magneto-optic memory, FIG. 11A being a plan view and FIG. 11B being a side view. In FIG. 11, parts similar to those of FIG. 10 are given similar reference numerals. The light beam emitted from a light source 101 such as a laser is condensed by a condenser lens 122 and directed to a single polarization optical fiber 112. The light beam directed to a condensing unit by the single polarization optical fiber while remaining to be a linearly polarized light is made into a parallel light beam by a collimater lens 126 and passes through a beam splitter 127 having a polarizing characteristic and through a glass block 109 to a hologram lens 108, and is condensed on a magneto-optic recording material 185 by the condensing characteristic of the hologram lens 108 through a substrate 184, whereby recording or reproduction is effected. The beam splitter 127 used herein has a transmission factor and a reflection factor for each polarized light so as to provide a characteristic optimum for the reading-out of magneto-optic record using the Kerr effect. As an example, the beam splitter has a transmission factor of 70% and a reflection factor of 30% for linearly polarized light having the same plane of vibration as the incident light beam and has a reflection factor of 100% for linearly polarized light orthogonal thereto.

The light beam reflected by the magneto-optic recording material 185 and varied in polarized state in accordance with the direction of magnetization thereof is reflected by the beam splitter 127 having a polarizing characteristic and further reflected by a reflecting surface 128, whereafter it is condensed by a condenser lens 129 and enters the single polarization optical fiber 114. The single polarization optical fiber has the capability of independently transmitting therethrough two linearly polarized lights orthogonal to each other, and these two linearly polarized lights, after having emerged from the optical fiber 114, are widened by a collimater lens 115 and separated from each other by a polarizing beam splitter 116, and then detected independently by photodetectors 110 and 111.

Accordingly, by setting the mounting direction of the single polarization optical fiber 114 to an appropriate direction and differentially amplifying the obtained signal output, the reading-out from the magneto-optic recording material can be effected at a high SN ratio irrespective of the fluctuation of the light source output and the fluctuation of the reflection factor of the recording material.

In the present embodiment, focus detection can be accomplished by making the condensing point by the condenser lens 129 during in-focus coincide with the end of the optical fiber 114 and adjusting the outputs of the photodetectors 110 and 111 so as to be maximum, but other method can also be used. Referring to FIG. 12 which shows an example in which the construction of the light source unit shown in FIG. 11A is changed, the light beam emitted from a light source 101 is made into a parallel light beam by a collimation lens 132 and passes through a polarizing beam splitter 133, and then enters a Faraday rotor 135. The Faraday rotor has the function of rotating the direction of vibration of the linearly polarized light having entered thereinto by a predetermined angle irrespective of the direction of travel thereof. Thus, if design is made such that the direction of vibration is rotated by 45° by this Faraday rotor 135, when the same linearly polarized light has returned thereto by being reflected, the light beam after having passed through the Faraday rotor has a plane of vibration orthogonal to the first light beam. This light beam is reflected by the polarizing beam splitter 133 and enters a photodetector 136. The reflected light beam used herein is the light beam which has passed through the beam splitter 127 having a transmission factor of 70% shown in FIG. 11 and therefore, a great quantity of light as compared with the signal detecting light can be handled. Also, this reflected light beam is a light beam which is not affected by the presence or absence of the signal and therefore, it can be used for focus detection and tracking detection and is little subjected to disturbance.

Figure 13:
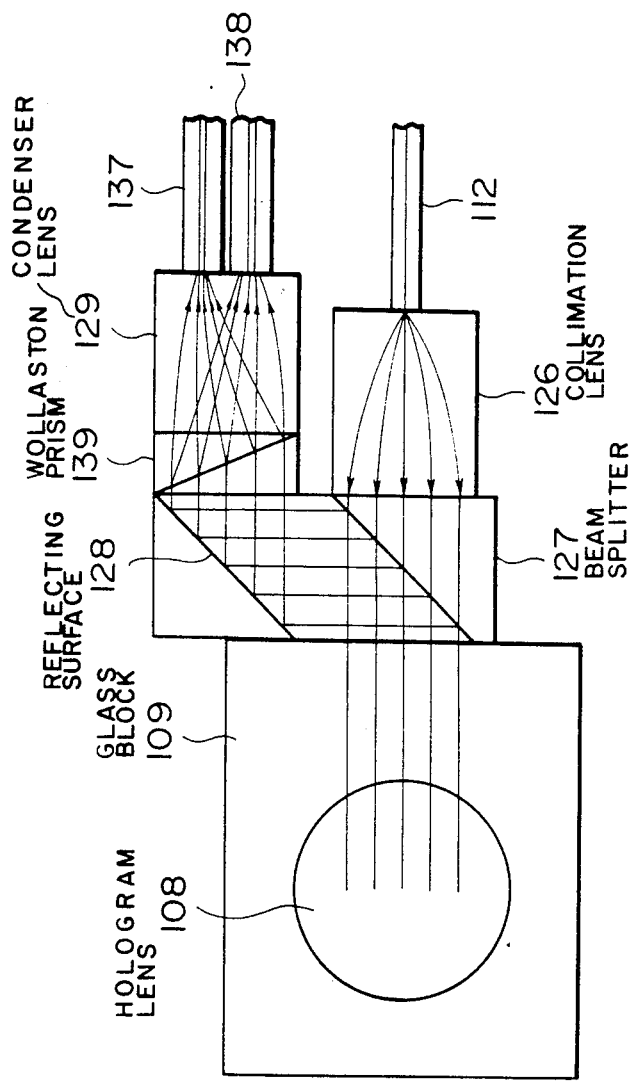
FIG. 13 is a fragmentary view showing the condensing unit of a sixth embodiment of the optical head of the present invention.

A sixth embodiment of the present invention in which the optical head of the present invention is applied for magneto-optic recording as in the fifth embodiment will now be described by reference to FIGS. 13 and 14. In these Figures, members similar to those of FIG. 11 are given similar reference numerals. The light beam reflected from a magneto-optic recording material, reflected by a beam splitter 127 and reflected by a reflecting surface 128 enters a Wollaston prism 139. The Wollaston prism 139 has the function of deflecting linearly polarized lights having planes of vibration in directions orthogonal to each other in directions inclined oppositely to the optical axis. The light beam is separated into two light beams in accordance with the polarized state thereof by the action of the Wollaston prism 139 and condensed by a condenser lens 129. In FIG. 13, for convenience of illustration, the light beam is shown as being separated into two directions in the plane of the drawing sheet, but actually, arrangement is made such that the reflected signal light from a portion which is rotated about the optical axis by about 45° and in which the recording of signals is not effected is separated into two light beams of equal intensities.

The light beams thus condensed enter optical fibers 137 and 138 having a dual core structure. The cross-sectional structure of the optical fiber having such dual core structure is shown in FIG. 14. In FIG. 14, a first clad 202 exists around the central core 201, and a cylindrical second core 203 and a second clad 204 exist around the first clad, and a jacket 205 is placed outside thereof. Since the optical fiber is of such structure, the light beam having entered the optical fiber from outside is transmitted to the central core and the marginal core separately, and thus there is obtained the same effect as that obtained by effecting photodetection by the use of concentric detectors.

Figure 15:
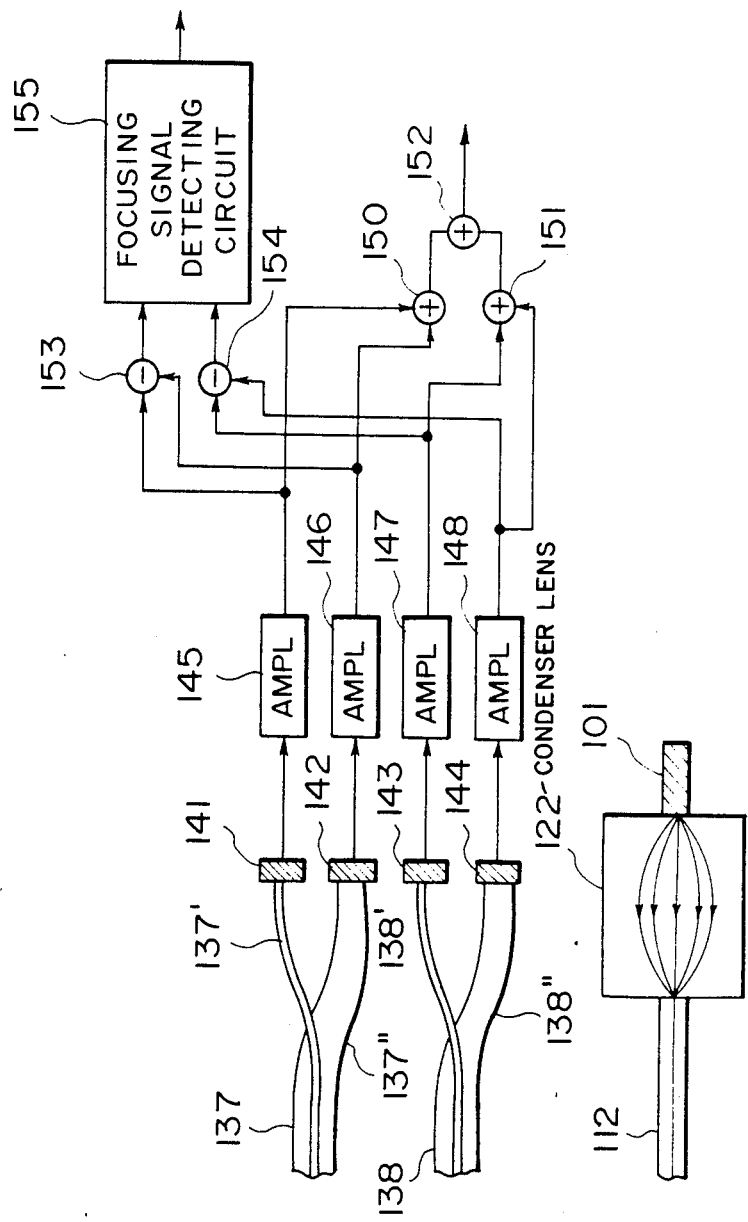
FIG. 15 is a fragmentary view showing the detecting unit of the sixth embodiment.

A method of detecting light beams directed by concentric circular fibers 137 and 138 is shown in FIG. 15. The light beams from respective core portions 137', 137'', 138' and 138'' are detected by photodetectors 141, 142, 143 and 144, respectively, and become electrical signals, which are amplified by amplifiers 145, 146, 147 and 148, respectively. For the detection of a reading signal, the quantity of light detected from the fiber 137 and the quantity of light detected from the fiber 138 are obtained from adders 150 and 151, respectively, and signal detection is accomplished by subtracting the difference between the two outputs by the use of a subtractor 152.

On the other hand, focus detection is realized by detecting the difference between the quantity of light transmitted through the central core portions 137' and 138' of the respective optical fibers and the quantity of light transmitted through the marginal core portions 137'' and 138'' of the respective optical fibers by the use of subtractors 153 and 154 and judging by a focusing signal detecting circuit 155. In FIG. 13, the end surfaces of the two optical fibers 137 and 138 are shown as being placed at positions defocused by the same amount from the condensing position, but various modifications such as placing the two forwardly and rearwardly of the condensing position are also conceivable and accordingly, various methods of detecting the focusing signal are conceivable.

In the present embodiment, a polarizing beam splitter may be used instead of the Wollaston prism.

Figure 16A:
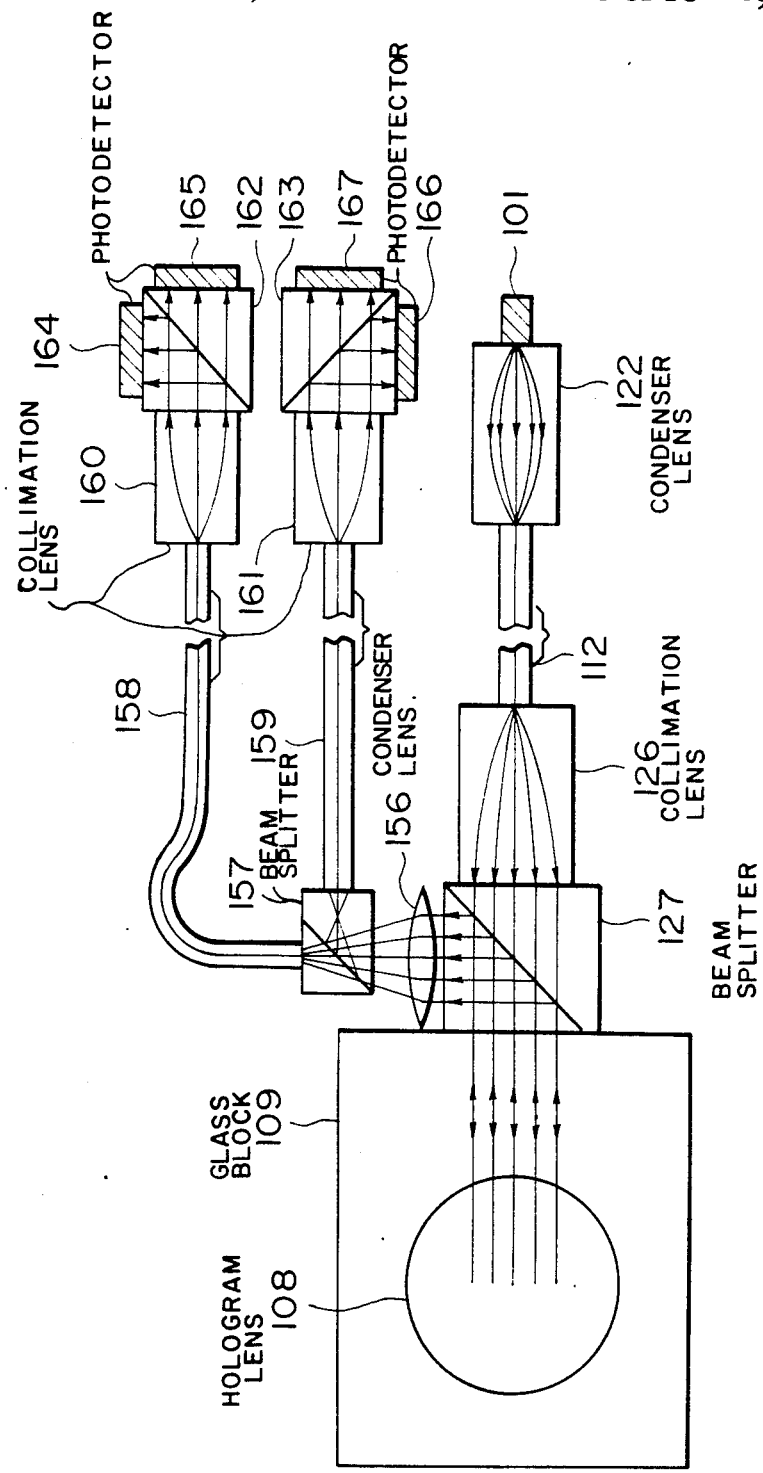
FIGS. 16A and 16B schematically show a seventh embodiment of the optical head of the present invention.
Figure 16B:
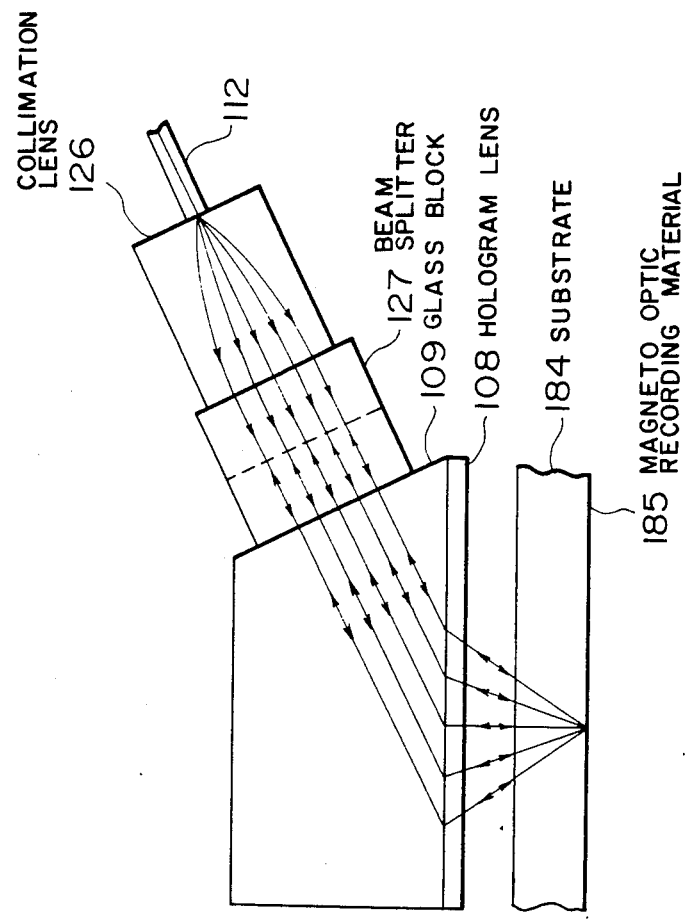

FIG. 16 shows a seventh embodiment of the optical head of the present invention used in a magneto-optic memory. In FIG. 16, portions common to those of the fifth embodiment are given similar reference numerals. The light beam emitted from a laser light source 101 is condensed by a condenser lens 122 and enters a single polarization optical fiber 112. The light beam emergent from the optical fiber 112 is made into a parallel light beam by a collimation lens 126 and passes through a beam splitter 127 having a polarizing characteristic. The polarizing beam splitter 127 used herein is given a characteristic optimum for the magneto-optic reading-out using the Kerr rotation and, for example, has a transmission factor of 70% and a reflection factor of 30% for the linearly polarized light of the incident light and has a reflection factor of 100% for linearly polarized light having a plane of vibration orthogonal thereto. The linearly polarized light beam transmitted through the polarizing beam splitter 127 passes through a prism 109 and is condensed on a magneto-optic recording surface 185 by a hologram lens 108 through a substrate 184. The light beam reflected by the magneto-optic recording surface and subjected to the Kerr rotation is diffracted by the hologram lens 108 and becomes a parallel light beam, and passes through the prism 109 and is reflected by the beam splitter 127, whereafter it is condensed by a condenser lens 156. A beam splitter 157 is disposed near the condensing point, and the light beam is divided into two light beams thereby, and these divided light beams enter single polarization optical fibers 158 and 159. These optical fibers are arranged forwardly and rearwardly of the condensing point of the reflected light when the in-focus state is provided on the recording surface 185 and therefore, a signal corresponding to the amount of defocus can be obtained from the total quantity of light transmitted through the respective optical fibers and detected. The respective fibers are mounted in the directions necessary for the differential amplification of the light beams separated in accordance with polarization so that the change of polarized state by the Kerr rotation in magneto-optic recording can be detected at the highest SN ratio. Collimation lenses 160 and 161 are disposed at the exit ends of the optical fibers, polarizing beam splitters 162 and 163 are disposed rearwardly of the collimation lenses, and photodetectors 164, 165, 166 and 167 are disposed at the exit ends of the respective beam splitters. The focusing signal is detected by taking the difference or ratio between the quantities of light emergent from the respective optical fibers while, on the other hand, reading-out of the magneto-optic recording signal is effected by taking the difference between the quantities of light separated and detected by the beam splitters 162 and 163 in accordance with the polarized state.

The present invention is not restricted to the above-described embodiments, but various modifications thereof are conceivable. For example, an ordinary lens and an off-axis hologram lens has been described as an example of the condensing means, whereas the present invention is not restricted thereto, but other various condensing means such as a non-spherical reflecting mirror shown below may be used.

Figure 17:
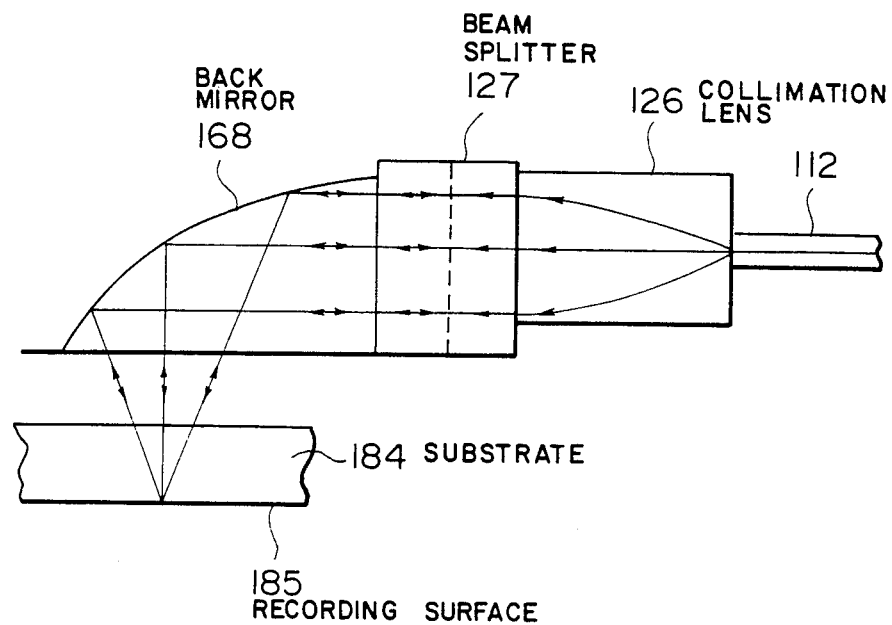
FIGS. 17 and 18 schematically show further examples of the construction of the condensing unit of the optical head of the present invention.

An example of the construction of only the condensing unit of the optical head of the present invention will hereinafter be described by reference to FIG. 17. The light beam transmitted through a single polarization optical fiber 112 is made into a parallel light beam by a collimater lens 126 and passes through a beam splitter 127, whereafter it enters a back mirror 168 having a non-spherical reflecting surface and is condensed on a recording surface 185 through a substrate 184. As regards such a non-spherical reflecting mirror, the capability of causing a light emitted from a particular point in space to be condensed at another point in space without aberrations is well known, but aberrations occurring relative to a change of the object position are very great and it has heretofore been impossible to use such mirror as the condensing means for an optical head. The present embodiment has solved the above-noted problem by forming the exit end of the optical fiber and the reflecting mirror integrally with each other, and has realized a compact and light-weight optical head.

Figure 18:
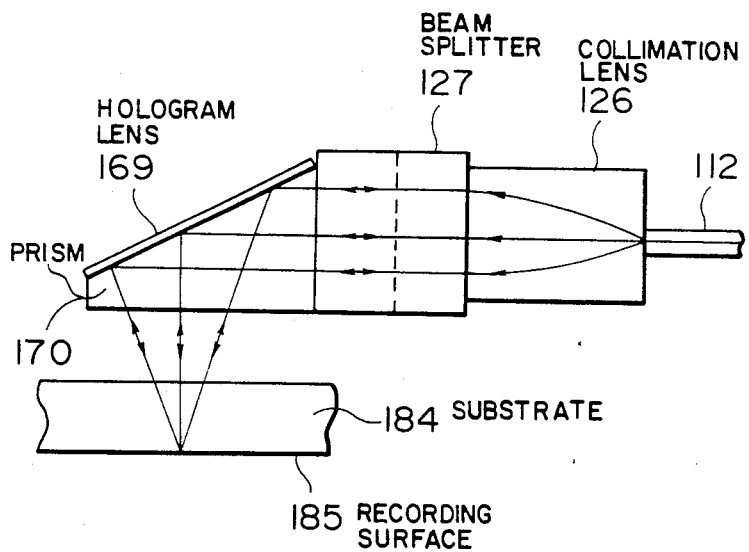

A further example of the construction of only the condensing unit will hereinafter be described by reference to FIG. 18. In FIG. 18, portions similar to those of FIG. 17 are given similar reference numerals and need not be described in detail. The parallel light beam from a beam splitter 127 enters a prism 170, and then is diffracted by a reflection type hologram lens 169 and condensed on a recording surface 185 through a substrate 184. The reflection type hologram lens used herein need not always be a volume type diffraction grating, but may also be a relief type brazed diffraction grating or the like. The relief type diffraction grating permits mass production by pressing and therefore can be manufactured inexpensively.

It will be apparent that the scope of application of the present invention is not limited to the optical head of the information recording-reproducing apparatus shown in the embodiments, but the invention is applicable to the optical heads of the heretofore known various optical apparatuses such as substance shape detecting apparatuses and the like.

What is claimed is:

1. An optical head comprising:
a light source unit for supplying a light beam;
a detecting unit for carrying out a detection;
a condensing unit for condensing the light beam from said light source unit on an object surface and directing the light beam from said object surface to said detecting unit in which the light beam from said condensing unit is detected, said condensing unit being movable relative to said light source unit and said detecting unit, and including a transparent block; and
a flexible optical transmitter for forming an optical path leading from said light source unit to said condensing unit and an optical path leading from said condensing unit to said detecting unit, said flexible optical transmitter having an end and said end being connected to said transparent block.

2. An optical head according to claim 1, wherein said flexible optical transmitter comprises an optical fiber.

3. An optical head according to claim 1, wherein said flexible optical transmitter comprises a single optical element which forms both of said two optical paths, and said light source unit and said detecting unit are formed integrally with each other and are connected to said condensing unit by said single optical element.

4. An optical head according to claim 1, wherein said transmitter comprises a single polarization optical fiber, and said light source unit and said detecting unit have means for separating the light beam supplied to said condensing unit and the light beam supplied from said condensing unit on the basis of a variation in the state of polarization.

5. An optical head according to claim 4, wherein said means comprises a polarizing beam splitter, and wherein a quarter wave plate is disposed in the optical path between said polarizing beam splitter and said object surface.

6. An optical head according to claim 5, wherein said quarter wave plate is disposed on said condensing unit.

7. An optical head according to claim 1, wherein said condensing unit includes a condensing means for condensing the light beam on said object surface and the position of the condensing means of said condensing unit and the position of the end of said optical transmitter are fixed relative to each other.

8. An optical head according to claim 7, wherein said condensing unit is movable in a direction perpendicular to said object surface in accordance with a focus error signal.

9. An optical head according to claim 7, wherein said object surface is an information recording surface and said condensing unit is movable parallel to said information recording surface in accordance with a tracking signal.

10. An optical head according to claim 8, wherein said condensing unit is movable by the use of a piezoelectric device.

11. An optical head according to claim 1, wherein said condensing unit has means for converging at least a part of the light beam from said object surface and introducing it to said optical transmitter comprising an optical fiber, and detects any variation in the quantity of the light beam to be transmitted by said optical fiber to obtain the focus detection signal of said condensing means relative to said object surface.

12. An optical head according to claim 1, wherein at least one of said light source unit and said detecting unit is connected to a plurality of said condensing units through an optical switch and a plurality of said optical transmitters changed over by said optical switch.

13. An optical head comprising:
a light source unit for supplying a light beam;
a detecting unit for carrying out a detection;
a condensing unit for condensing the light beam from said light source unit on an object surface by a hologram lens and directing the light beam from said object surface to said detecting unit in which the light beam from said condensing unit is detected, said condensing unit being movable relative to at least one of said light source unit and said detecting unit, and including a transparent block; and
a flexible optical transmitter for forming at least one of an optical path leading from said light source unit to said condensing unit and an optical path leading from said condensing unit to said detecting unit, said flexible optical transmitter having an end and said end being connected to said transparent block so that the position of the end of said optical transmitter and the position of said hologram lens are fixed relative to each other.

14. An optical head according to claim 13, wherein said hologram lens comprises an off-axis type hologram lens.

15. An optical head according to claim 13, wherein said hologram lens comprises a reflection type hologram lens.

16. An optical head comprising:
a light source unit for supplying a light beam;
a detecting unit for carrying out a detection;
a condensing unit for condensing the light beam from said light source unit on an object surface by an aspherical reflecting mirror and directing the light beam from said object surface to said detecting unit in which the light beam from said condensing unit is detected, said condensing unit being movable relative to at least one of said light source unit and said detecting unit, and including a transparent block; and a flexible optical transmitter for forming at least one of an optical path leading from said light source unit to said condensing unit and an optical path leading from said condensing unit to said detecting unit, said flexible optical transmitter having an end and said end being connected to said transparent block so that the position of the end of said optical transmitter and the position of said aspherical reflecting mirror are fixed relative to each other.

17. An optical head comprising:
a light source unit for supplying a linearly polarized light beam;
a condensing unit for condensing the linearly polarized light beam from said light source unit on a magnetic recording medium on which information is recorded, said condensing unit including a transparent block;
a single polarization optical fiber for transmitting therethrough the light beam from said magnetic recording medium modulated by said information, said optical fiber having an end and said end being connected to said transparent block; and
a detecting unit for detecting the light beam transmitted through said single polarization optical fiber and reading said information.

18. An optical head according to claim 17, wherein said single polarization optical fiber has a property of independently transmitting a set of linearly-polarized lights intersecting orthogonally with each other.

19. An optical head according to claim 18, wherein the direction of polarization of the light transmitted by said single polarization optical fiber is set to have an angle of 45° relative to the plane of vibration of one of the light beams whose planes of vibration are rotated in different directions by said modulation.

20. An optical head according to claim 18, wherein said detecting unit separates the light beam transmitted through said single polarization optical fiber by the direction of polarization thereof and differentially detects the separated light beams.

21. An optical head comprising:
a light source unit for supplying a linearly polarized light beam;
a condensing unit for condensing the linearly polarized light beam from said light source unit on a magnetic recording medium on which information is recorded and separating the light beam from said magnetic recording medium modulated in accordance with said information by the polarized state thereof, said condensing unit including a transparent block;
a set of optical transmitters for transmitting therethrough the light beams separated by said condensing unit, said optical transmitter having an end and said end being connected to said transparent block; and
a detecting unit for differentially detecting the light beams transmitted by said transmitters and reading said information.

22. An optical head according to claim 21, wherein said optical transmitters are optical fibers.

23. An optical head according to claim 21, wherein said condensing unit separates said light beam by a Wollaston prism.

24. An optical head according to claim 17, wherein the linearly polarized light beam from said light source unit is transmitted to said condensing unit by the single polarization optical fiber.

25. An optical head according to claim 21, wherein the linearly polarized light beam from said light source unit is transmitted to said condensing unit by a single polarization optical fiber.

26. A method of detecting the focus of an optical head comprising the steps of:
condensing a light beam emitted from a light source on an object to be irradiated by a condensing unit including a transparent block;
converging at least a part of the reflected light beam from said object to be irradiated by a converging means to introduce the converged reflected light beam into an optical transmitter an end of which is connected to said transparent block; and
detecting any variation in the quantity of light of the reflected light beam transmitted by said optical transmitter to obtain a focus detection signal.

27. A method according to claim 26, wherein said optical transmitter comprises a single mode optical fiber.

28. A method according to claim 26, wherein said optical transmitter comprises an optical fiber of multi-core structure and focus detection is effected on the basis of one of the difference and ratio between the quantities of light of the light beams transmitted by the core portions of said optical fiber.

29. A method according to claim 26, wherein two optical transmitters are disposed forwardly and rearwardly of the converged position of said reflected light beam and focus detection is effected on the basis of the difference and ratio between the quantities of light of the light beams transmitted by said two optical transmitters.

30. A method according to claim 26, wherein said optical transmitter comprises a single polarization optical fiber, the converged position of said reflected light beam is separated in the direction of the optical axis of said converging means in accordance with the state of polarization, said optical fiber is disposed between the separated converged positions to independently transmit the separated light beams, and focus detection is effected on the basis of one of the difference and ratio between the quantities of light of the transmitted light beams.

31. An optical head according to claim 9, wherein said condensing unit is movable by the use of a piezoelectric device.

32. An optical head according to claim 1, wherein said transparent block comprises a collimater lens block.

* * * * *

UNITED STATES PATENT AND TRADEMARK OFFICE
CERTIFICATE OF CORRECTION

PATENT NO. : 4,626,679　　　　　　　　　　　　　　　Page 1 of 2
DATED : December 2, 1986
INVENTOR(S) : TETSURO KUWAYAMA, ET AL.

It is certified that error appears in the above-identified patent and that said Letters Patent is hereby corrected as shown below:

COLUMN 5

Line 47,　"as" should read --an--.

COLUMN 6

Line 32,　"rotary, shaft" should read --rotary shaft--.

COLUMN 9

Line 58,　"collimater" should read --collimator--.

COLUMN 10

Line 34,　"method" should read --methods--.

COLUMN 12

Line 58,　"collimater" should read --collimator--.

UNITED STATES PATENT AND TRADEMARK OFFICE
CERTIFICATE OF CORRECTION

PATENT NO. : 4,626,679

DATED : December 2, 1986

INVENTOR(S) : TETSURO KUWAYAMA, ET AL.

It is certified that error appears in the above-identified patent and that said Letters Patent is hereby corrected as shown below:

COLUMN 16

Line 58, "collimater" should read --collimator--.

Signed and Sealed this

Seventeenth Day of March, 1987

Attest:

DONALD J. QUIGG

Attesting Officer

Commissioner of Patents and Trademarks